L. S. HACKNEY.
CONTROLLING DEVICE FOR TRACTION VEHICLES.
APPLICATION FILED MAY 18, 1914.
1,245,708. Patented Nov. 6, 1917.
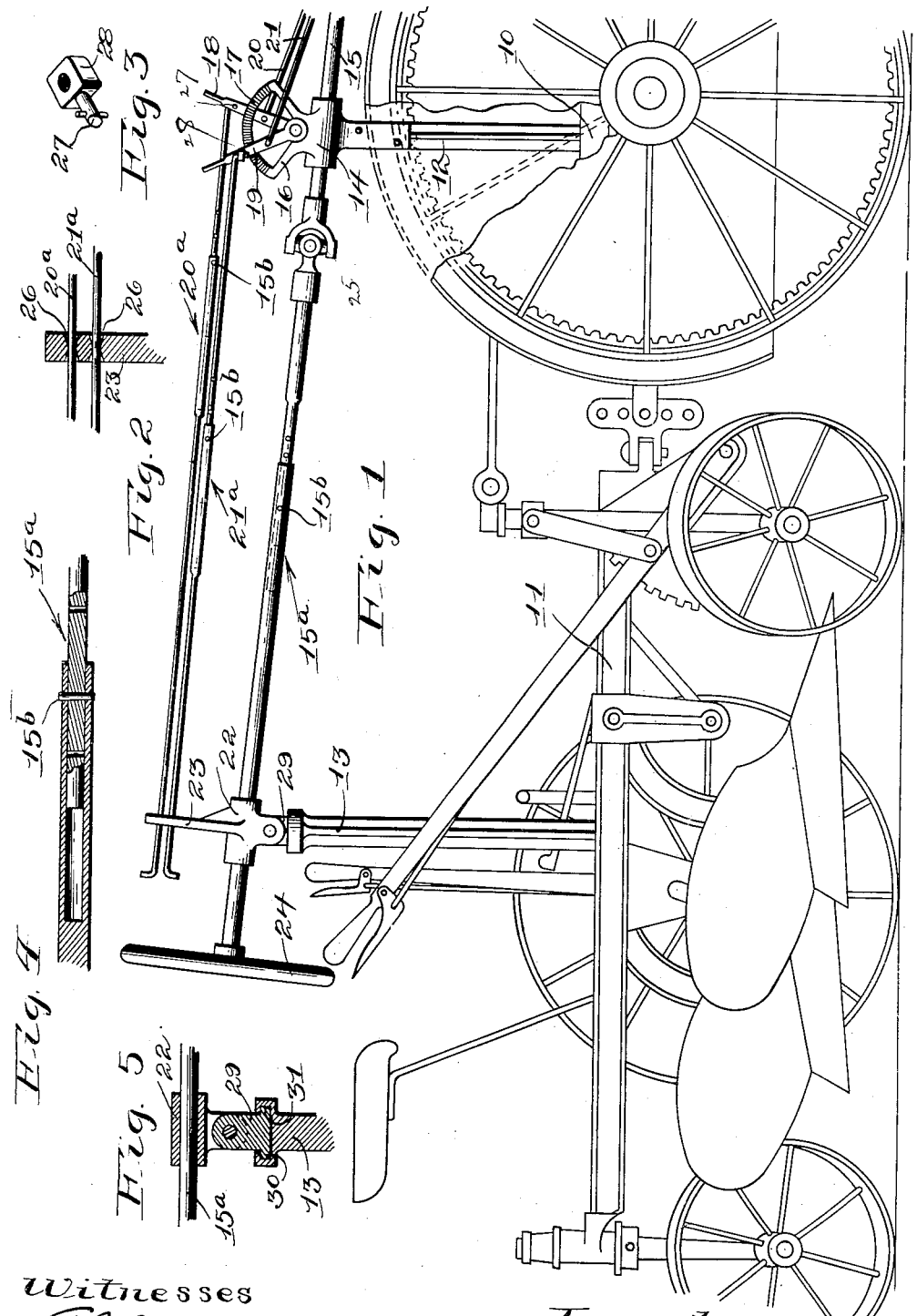

UNITED STATES PATENT OFFICE.

LESLIE S. HACKNEY, OF ST. PAUL, MINNESOTA.

CONTROLLING DEVICE FOR TRACTION-VEHICLES.

1,245,708.　　　　Specification of Letters Patent.　　Patented Nov. 6, 1917.

Application filed May 18, 1914. Serial No. 839,186.

*To all whom it may concern:*

Be it known that I, LESLIE S. HACKNEY, a citizen of the United States, residing at St. Paul, in the county of Ramsey and State of Minnesota, have invented new and useful Improvements in Controlling Devices for Traction-Vehicles, of which the following is a specification.

The common forms of traction vehicles ordinarily employ a number of controlling devices located and operated so as to necessitate the constant presence of the operator on the vehicle and when such tractors are used to supply motive power for earth-working and other like machines, a second attendant is required to manipulate the operating mechanism of such machine.

It is my object to provide a controlling device for a traction vehicle adapted to steer the same, regulate the operation of its engine and actuate its power transmitting mechanism through a flexible extension arranged to be manipulated from the machine or trailer drawn by said traction vehicle. In other words, I propose to control both the tractor and the hauled implement from a single position on the latter.

In the drawings, Figure 1 is a side elevation of my improved device; Figs. 2, 3, 4 and 5 are respectively detail views illustrating certain parts thereof.

Referring to the drawings, I have used the reference numeral 10 to indicate the frame of the tractor and the numeral 11 to designate the frame of the implement or other vehicle which is flexibly attached to and drawn by said tractor.

In my improved device, I provide a pair of posts 12 and 13 which are mounted respectively upon the frames 10 and 11. The post 10 is furnished at its top with a bearing 14 rigidly secured thereto. A steering shaft 15, slidably and revolubly supported within said bearing, is operatively connected in any convenient manner (not shown) with the steering devices and transmission gearing of the tractor whereby the same are respectively operated when said shaft is turned and moved longitudinally. A lever quadrant 16, having a notched arc 17 thereon, is formed upon the bearing 14. Actuating levers 18 and 19, pivoted upon the quadrant 16, frictionally engage the opposite sides of the notched arc 17 and said levers are connected with actuating rods 20 and 21 passing to the engine (not shown) of the tractor.

The post 13 is secured to the frame 11 of the implement and the bearing 22, having a guide 23 thereon, is pivoted vertically and swiveled horizontally upon said post. The steering shaft 15$^a$ is slidably and revolubly mounted in the bearing 22. Said shaft is supplied at the rear end thereof with a hand wheel 24 and at its forward end with a universal joint 25, which is connected to the steering shaft 15 at a point approximately above the connection between the tractor frame 10 and implement frame 11. Actuating rods 20$^a$ and 21$^a$ are connected respectively to the levers 18 and 19. The connection between these rods and levers respectively is a universal joint and consists of a pintle 27 revolubly mounted upon an arm, said pintle being provided with a perforated head 28 to pivotally receive the down turned end of the rod. These rods extend rearward nearly to the hand wheel 24 and pass through openings 26 in the guide 23.

To facilitate applying my improved mechanism to machines of various styles and sizes, I make each of the rods 20$^a$ and 21$^a$ and the shaft 15$^a$ in two parts, said parts being telescopically joined and secured in adjustable relation by means of a pin 15$^b$ or the like, as illustrated in detail in Fig. 4 of the drawings.

The connection between the post 13 and bearing 22 is formed by a link 29. Said link pivotally supports the bearing at its upper end, and is supplied with an annular flange 30 at its lower end which is retained, free to turn, in the annular groove 31 in the top of said post.

In use, the operator sits upon the implement and manipulates the wheel 24 and actuating rods 20$^a$ and 21$^a$ to control the tractor, the steering shaft 15$^a$, and said rods 20$^a$ and 21$^a$ being automatically adjusted to accommodate themselves to varying relative positions of the tractor and implement.

Having described my invention, what I claim as new and desire to protect by Letters Patent, is:

1. The combination with a tractor and a vehicle flexibly attached thereto, of a support upon said tractor, a second support upon said vehicle, a mounting pivoted vertically and horizontally upon said last-mentioned support, and an operating shaft having a hand wheel thereon, said shaft being carried by said mounting and said first-mentioned support.

2. The combination with a tractor and a vehicle flexibly attached thereto, of a flexible and extensible operating device carried by said tractor and vehicle and adapted to control the former from a position upon the latter and also to compensate for the irregularity of movement in travel between said tractor and vehicle, said device including a steering shaft and actuating rods, which consist of members telescopically joined and secured in adjustable relation.

3. The combination with a tractor and a vehicle flexibly attached thereto, of a support upon said tractor, a second support upon said vehicle, a mounting pivoted vertically and horizontally upon said last mentioned support, a shaft having a hand wheel thereon, said shaft being revoluble and slidable in said mounting and in said first mentioned support and being also formed with a flexible joint between said mounting and support, and actuating rods for the tractor mechanism slidable in said mounting.

4. The combination with a tractor and a machine flexibly attached thereto, of a support upon said tractor, a second support upon said vehicle, a mounting pivoted vertically and horizontally upon said last mentioned support, a shaft having a hand wheel thereon, said shaft being revoluble and slidable in said mounting and in said first mentioned support and being also formed with a flexible joint between said mounting and support, and actuating rods for the tractor mechanism slidable in said mounting, said rods and shaft comprising members telescopically joined and secured in adjustable relation.

In testimony whereof, I have signed my name to this specification in the presence of two subscribing witnesses.

LESLIE S. HACKNEY.

Witnesses:
   P. C. CASWELL,
   LOUIS JOHNSON.